US012106327B2

(12) United States Patent
Maliszewski et al.

(10) Patent No.: US 12,106,327 B2
(45) Date of Patent: *Oct. 1, 2024

(54) SYSTEM AND METHOD FOR THIRD PARTY MOBILE MEDIA CONTROL

(71) Applicant: Productive Application Solutions, Inc., Sheridan, WY (US)

(72) Inventors: Gerald Maliszewski, San Diego, CA (US); Peter Ta, Tucson, AZ (US)

(73) Assignee: Productive Application Solutions, Inc., Sheridan, WY (US)

( * ) Notice: Subject to any disclaimer, the term of this patent is extended or adjusted under 35 U.S.C. 154(b) by 879 days.

This patent is subject to a terminal disclaimer.

(21) Appl. No.: 17/168,313

(22) Filed: Feb. 5, 2021

(65) Prior Publication Data

US 2021/0166274 A1 Jun. 3, 2021

Related U.S. Application Data

(63) Continuation-in-part of application No. 17/133,722, filed on Dec. 24, 2020, now Pat. No. 11,055,743, (Continued)

(51) Int. Cl.
*G06Q 30/00* (2023.01)
*G06Q 30/0242* (2023.01)
*G06Q 30/0251* (2023.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC .......... G06Q 30/0244; G06Q 30/0252; G06Q 30/0267

(Continued)

(56) References Cited

U.S. PATENT DOCUMENTS 4,259,660 A * 3/1981 Oliver .................. B60Q 1/2611
116/40
5,878,516 A * 3/1999 Amirian .................. G09F 21/04
40/591

(Continued)

FOREIGN PATENT DOCUMENTS

FR 2578996 A1 * 9/1986 ............. G09F 21/04
GB 2402254 A * 12/2004 ........... G06Q 20/127

(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57) ABSTRACT

A third party-directed mobile media system is provided with a chassis, configured for attachment to a mobile platform associated with a first entity. An included media subsystem may be a media projection subsystem or a publically accessible access point (or both). Examples of an access point include WLAN and WPAN devices. Examples of a media projection subsystem include an image projector, a retractable screen deployed over an exterior surface of the mobile platform, a media topper, a switchable glass display, or a wallscape. A location subsystem determines the geographic location of the mobile platform. A wireless communications subsystem has an interface to receive verification information including the mobile platform geographic location, and an interface to receive mobile platform geographic location destination instructions from a second entity. An autonomous driving application may be included, permitting the (Continued)

mobile platform to be autonomously driven to the selected mobile platform geographic location destination.

19 Claims, 12 Drawing Sheets

Related U.S. Application Data which is a continuation-in-part of application No. 17/097,256, filed on Nov. 13, 2020, now Pat. No. 11,887,163, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | | |
|---|---|---|---|---|
| 5,974,711 | A * | 11/1999 | Tipke | G09F 21/04 |
| | | | | 362/503 |
| 6,247,257 | B1 * | 6/2001 | Powell | G09F 21/04 |
| | | | | 280/507 |
| 6,412,202 | B1 * | 7/2002 | Oswood | G09F 21/04 |
| | | | | 40/204 |
| 6,918,200 | B2 * | 7/2005 | Pena | G09F 21/02 |
| | | | | 40/591 |
| 6,971,070 | B2 * | 11/2005 | Obradovich | B60W 50/14 |
| | | | | 715/835 |
| 7,347,017 | B2 * | 3/2008 | Shaffer, Jr. | G09F 21/04 |
| | | | | 296/21 |
| 7,774,966 | B2 * | 8/2010 | Rosa | G09F 21/048 |
| | | | | 40/590 |
| 7,882,653 | B2 * | 2/2011 | Barlow | G06Q 30/0275 |
| | | | | 40/606.15 |
| 8,418,386 | B1 * | 4/2013 | Key | G09F 21/048 |
| | | | | 40/590 |
| 9,076,336 | B2 * | 7/2015 | Tippelhofer | G08G 1/148 |
| 9,939,287 | B2 * | 4/2018 | Castellucci | G01C 21/3476 |
| 10,382,579 | B2 * | 8/2019 | Mevissen | H04L 67/306 |
| 10,482,766 | B2 * | 11/2019 | Mowatt | G08G 1/144 |
| 10,733,891 | B2 * | 8/2020 | Chow | G08G 1/04 |
| 2002/0009978 | A1 * | 1/2002 | Dukach | G08G 1/01 |
| | | | | 455/99 |
| 2006/0265922 | A1 * | 11/2006 | Shaffer, Jr. | G09F 21/048 |
| | | | | 40/591 |
| 2009/0084009 | A1 * | 4/2009 | Vandergriff | G09F 13/18 |
| | | | | 40/546 |
| 2011/0131235 | A1 * | 6/2011 | Petrou | G06F 16/532 |
| | | | | 707/769 |
| 2012/0245966 | A1 * | 9/2012 | Volz | G06Q 10/02 |
| | | | | 705/5 |
| 2013/0307706 | A1 * | 11/2013 | Kriezman | B60Q 1/503 |
| | | | | 340/988 |
| 2014/0214319 | A1 * | 7/2014 | Vucetic | G01C 21/3446 |
| | | | | 701/533 |
| 2014/0309865 | A1 * | 10/2014 | Ricci | G06F 16/583 |
| | | | | 701/36 |
| 2015/0123818 | A1 * | 5/2015 | Sellschopp | G08G 1/096816 |
| | | | | 340/932.2 |
| 2015/0254721 | A1 * | 9/2015 | Rad | G06Q 30/0266 |
| | | | | 705/14.63 |
| 2015/0279210 | A1 * | 10/2015 | Zafiroglu | G08G 1/065 |
| | | | | 340/932.2 |
| 2016/0116293 | A1 * | 4/2016 | Grover | G01C 21/34 |
| | | | | 701/23 |
| 2016/0191879 | A1 * | 6/2016 | Howard | H04N 9/3147 |
| | | | | 348/745 |
| 2017/0309170 | A1 * | 10/2017 | Wang | G08G 1/146 |
| 2018/0186309 | A1 * | 7/2018 | Batten | B60Q 1/56 |
| 2018/0186311 | A1 * | 7/2018 | Mason | B60R 21/01 |
| 2019/0121522 | A1 * | 4/2019 | Davis | G06F 3/04815 |
| 2019/0135180 | A1 * | 5/2019 | Watatsu | B60R 1/001 |
| 2021/0001724 | A1 * | 1/2021 | Dobashi | B60K 35/00 |

FOREIGN PATENT DOCUMENTS

| | | | | | |
|---|---|---|---|---|---|
| JP | | 2010026474 A | * | 2/2010 | G09F 21/048 |
| JP | | 2018072077 A | * | 5/2018 | G01S 19/14 |
| JP | | 2018205399 A | * | 12/2018 | G09F 21/04 |
| WO | WO-2008135617 A1 | | * | 11/2008 | G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*

Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*

Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*

Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*

Technoframe. LED Bus Screens. (Nov. 18, 2011). Retrieved online Aug. 13, 2020. https://technoframe.com/led-bus-screens (Year: 2011).*

Livedesign. Art on the MART: World's Largest Permanent Projection Mapping System. (Nov. 29, 2018). Retrieved online Oct. 23, 2021. https://www.livedesignonline.com/excellence-installation-awards/art-themart-world-s-largest-permanent-projection-mapping-system (Year: 2018).*

Parker, Phillip, "The 2018-2023 World Outlook for Outdoor Advertising", 2017 ICON Group International.

* cited by examiner

SYSTEM AND METHOD FOR THIRD PARTY MOBILE MEDIA CONTROL

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to mobile media presentation and, more particularly, to systems and methods permitting mobile media platforms to be operated by third parties.

2. Description of the Related Art

Market research shows that outdoor billboard marketing space has increasingly become harder to find and, hence, more valuable. At the same time, automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses to problem of finding more outdoor advertising space by providing an automotive targeted parking system that adds to an automobile the additional feature of a media display subsystem, and which may also include a Wireless Local Area Network (WLAN) IEEE 802.11 (WiFi) access point (hotspot).

While the above-described system addresses the provision of additional outdoor advertising through the "gig economy" use of automobiles, the act of parking remains a potential issue. Parking in many desirable advertising locations in metropolitan areas is limited to one or two hours only. Further, the desirability of some advertising locations changes throughout the course of a day. Thus, the necessity of frequently changing parking spots can become a burden and may make the use of their automobile as a mobile media center impractical for some owners.

It would be advantageous if an automobile could be used as portable real estate, capable of projecting media and acting as a communications center.

It would be advantageous if the above-mention automobile could be moved to different parking spots throughout the course of a day by a third party, independent of the automobile owner. Further, it would be advantageous if the third party was able to control the automobile through the use of an autonomous self-driving system.

In some desirable advertising locations, even automobile parking spots are hard to find on a consistent basis. In these situations, it would be advantageous if a pedestrian mobile media system could make use sidewalks.

SUMMARY OF THE INVENTION

A system and method are disclosed herein for automotive vehicle positioning, for use in providing Wireless Local Area Network (WLAN) IEEE 802.11 (WiFi) and Wireless Personal Area Network (WPAN) access points, and media projection subsystems. Advantageously, the vehicles can be moved by third parties, e.g., advertisers providing the media, independent of the entity who owns the vehicles. Thus, the system may act as a mobile advertising platform that seeks to expand and capture market share within the outdoor advertising market segment by directing the selective deployment of media and WLAN/WPAN services to preferred target locations. The system may transmit the following information: (i) a unique identifier for the device in use (for example, radio-frequency identification), (ii) the time, date, duration, and location (using global positioning satellite (GPS) or cellular triangulation systems), (iii) an indication that the media projection subsystem has been deployed, and (iv) an indication that the WLAN/WPAN access point is in use. Graphic information system (GIS) mapping technology may be used to compensate a person or business entity associated with the system for operating in specified locations. One of the primary features of the system is its ability to determine if a vehicle is temporarily at rest or parked in a stationary location.

Accordingly, a third party-directed mobile media system is provided with a chassis, configured for attachment to a mobile platform associated with a first entity. A media system is configured for attachment to the chassis. The media subsystem may include a media projection subsystem or a publically accessible access point (or both). Examples of an access point include a WLAN, e.g., WiFi, a WPAN, e.g., Bluetooth, or both WLAN and WPAN devices. Examples of a media projection subsystem include an image projector, a retractable screen deployed over an exterior surface of the mobile platform, a media topper, a switchable glass display, an LCD or LED TV monitor type display, and a wallscape. The system includes a location subsystem to determine a geographic location of the mobile platform and a wireless communications subsystem. The wireless communications subsystem has an interface to receive verification information including the mobile platform geographic location, and an interface to receive mobile platform geographic location destination instructions from a second entity. For example, the first entity may own the media subsystem or mobile platform, and the second entity may be providing the media and instructions as to where the mobile platform may be deployed.

In one aspect, a human agent user interface (UI) is connected to the communications subsystem to receive the mobile platform geographic location destination instructions from the second entity. As such, the human agent (e.g., first entity) is able drive the mobile platform to the selected destination. Otherwise, a mobile platform autonomous driving application is included in the system, permitting the mobile platform to be autonomously driven to the selected mobile platform geographic location destination.

In some aspects the communications subsystem receives verification information including the enablement of the media projection subsystem, the enablement of the access point, or the enablement of both the media projection subsystem and the access point. The wireless communications subsystem stores the verification in local memory or transmits the information to a central server. In another aspect, the communications subsystem receives enablement verification information when the mobile platform is parked in the mobile platform geographic location destination selected by the second entity. Alternatively, the verification information is received when the mobile platform is following a mobile platform geographic location destination route selected by the second entity.

The system may include a targeting subsystem that permits the second entity to select the mobile platform geographic location destination from a plurality of potential weighted value destinations. Further, a reward subsystem may provide a reward to the first entity, in response to the selected destination weighted value. The reward is based upon factors such as the duration of time that the mobile platform occupies the selected destination, the destination route, the time of day, the time of year, and combinations thereof. In one aspect, the system includes a camera, configured for attachment to the chassis, having an output to supply images of a geographic location proximate to the chassis. The communications subsystem accepts the camera images and either stores them in local memory or transmits them to the central server.

Also disclosed herein is a pedestrian mobile media system that includes a chassis and a movement subsystem attached to the chassis. The movement subsystem is configured for moving the chassis on a pedestrian thoroughfare. This system also includes a media subsystem configured for attachment to the chassis. As above, the media subsystem may be a media projection subsystem or a publically accessible access point. A location subsystem determines the geographic location of the chassis. A wireless communications subsystem receives verification information including the chassis geographic location and also receives chassis geographic location destination instructions. The chassis may be associated with (e.g., owned by) a first entity and the chassis geographic location destination instructions are received from a second entity that is "renting" the system.

Also as above, a human agent UI may receive the mobile platform geographic location destination instructions from the second entity and, thus, the human agent is able move the chassis to the selected destination. Otherwise, a mobile platform autonomous driving application is included in the system, permitting the chassis to be autonomously moved to the selected mobile platform geographic location destination.

Additional details of the above-described systems are provided below.

DETAILED DESCRIPTION

Figure 1A:
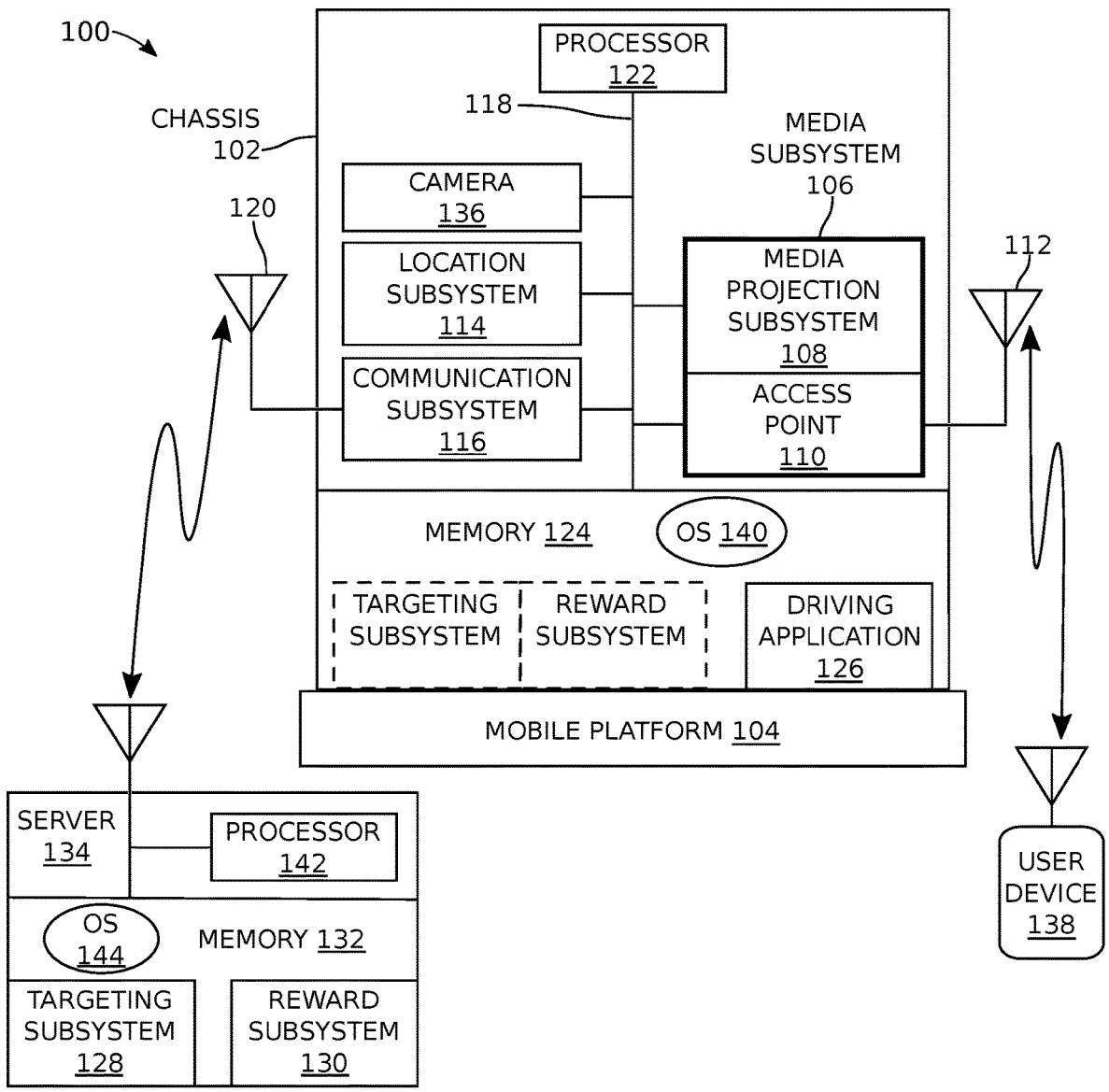
FIGS. 1A and 1B are diagrams depicting a third party-directed mobile media system.
Figure 1B:
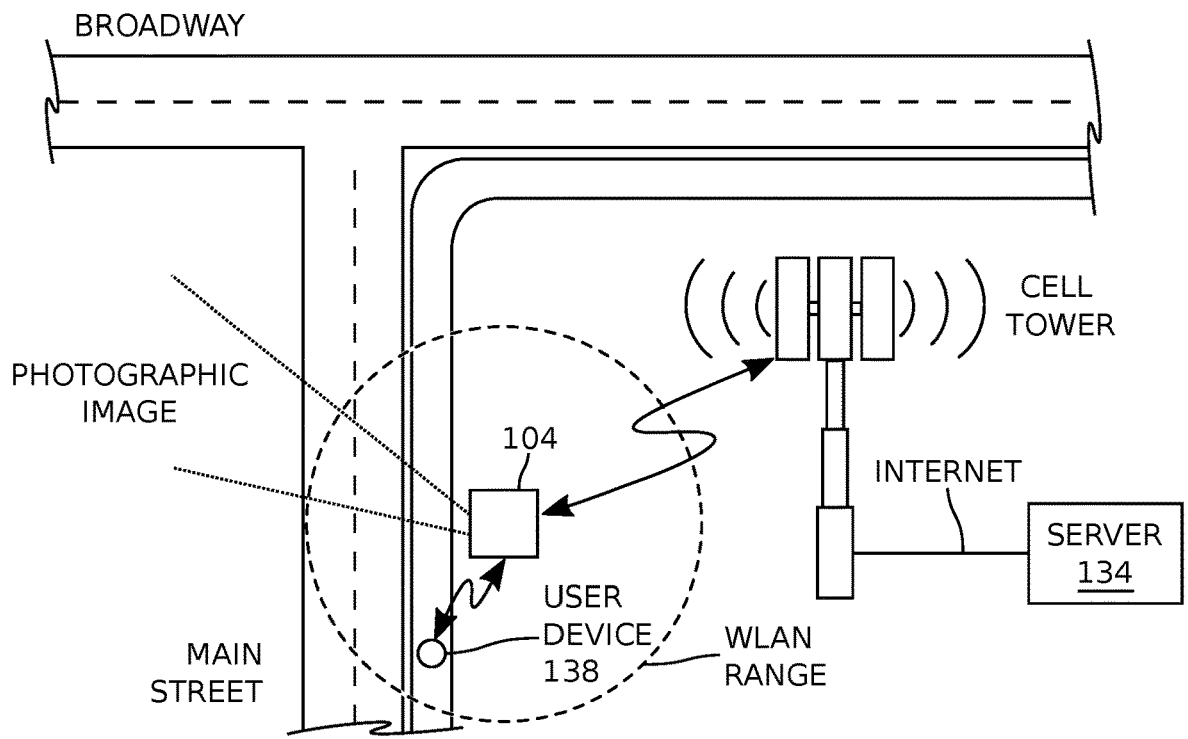

FIGS. 1A and 1B are diagrams depicting a third party-directed mobile media system. The system 100 comprises a chassis 102, configured for attachment to a mobile platform 104 associated with a first entity. As used herein, an "entity" may be a person, a business, a corporation, or any type of social organization or business unit able to claim ownership of, or association with, the identification code, chassis 102, system 100, mobile platform 104, server, or server clients. The chassis 102 may also include an internal battery and/or cables for attachment to an external power source. The chassis typically includes miscellaneous electronic circuitry required to support the major components described below, as would well understood in the art. The chassis 102 may include components for attaching to the mobile platform 104. Some common examples of a mobile platform include an automotive vehicle, scooter, truck, a towed trailer, or portable objects that are small enough to be moved without wheels, (e.g., a sidewalk sign). A media subsystem 106 is configured for attachment to the chassis 102.

The media subsystem 106 may be a media projection subsystem 108, a publically accessible access point 110, or both. The access point 110 may be a wireless local area network (WLAN), e.g., WiFi, a wireless personal area network (WPAN), e.g., Bluetooth, or both, connected to antenna 112. Alternatively, but less common, the access point 110 may an IEEE 802.15.4 Zigbee, WPAN IEEE 802.15 Li-Fi or wireless USB device. Even more unlikely as an access point are Long Range Wireless systems. In the case of the WiFi hotspot being a component of the communications subsystem 116 (presented below), items 110 and 116 may be collocated. In one aspect, the access point can be used to collect data from entities passing by, or engaging with the access point. This data can be stored in local memory 124 for subsequent recovery or transmitted to server 134.

Some examples of the media projection subsystem 108 include an image projector, a retractable screen deployed over an exterior surface of the mobile platform, or an LCD or LED TV monitor type display, a media topper, a popup, a wallscape, holographic display, switchable glass displays (such as made by Gauzy), and combinations thereof. For example, a screen deployment mechanism may wrap and unwrap a flexible screen material around a roller. The system 100 is not limited to any particular type of screen material or deployment means. A viewing screen may be selectively deployable by the screen deployment mechanism when the mobile platform 104 is parked in a stationary geographic location. Typically, a flexible viewing screen cannot safely be deployed unless the mobile platform is stationary. The media subsystem 108 may be selectively engageable to project an image onto the deployed viewing screen. The media subsystem 108 may also broadcast audio messages.

The chassis 102 may be configured for attachment to the roof of an automotive vehicle 104, and a viewing screen may be deployed over an exterior surface (e.g., door) of the automotive vehicle 104. However, it should be understood that the viewing screen may, alternatively, be deployed over other exterior surfaces (e.g., front or back). Although not shown, the system 100 may include two chasses with screens overlying driver and passenger side doors. However, the system is not limited to any particular number of chasses, with supporting subsystems. The media subsystem 108 may be a popup that extends vertically up from a substantially planar horizontal roof. Alternatively, an imaging projector subsystem may project images on both sides of the popup viewing screen, or more than one chassis/viewing screen/imaging projector subsystem may be attached to the roof.

The media subsystem 108 may be an image projector enabled as a liquid crystal (LC) or light emitting diode (LED) display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. The media subsystem may also be an LCD or LED TV monitor type display. In other words, the media subsystem may be a 2-dimensional or 3-dimensional image, which may or may not be transitory. Transitory images include a series of still images, videos, or combinations thereof. In the one aspect, for example in the case of a popup, at least some portions of the media being projected may rotate around a vertical z axis.

A location subsystem 114 determines the geographic location of the mobile platform 104. Examples of a location subsystem 114 include a Global Positioning Satellite (GPS) system receiver, assisted GPS taking advantage of cell tower data, a Wireless Local Area Network IEEE 802.11 (WiFi) positioning system, cell-site multilateration, satellite multi-lateration, inertial system, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

A wireless communications subsystem 116 has an interface to receive verification information including the mobile platform geographic location and an interface to receive mobile platform geographic location destination instructions from a second entity. Typically, the verification information includes the geographic location provided in the destination instructions. That is, the verification information includes an acknowledgement that the mobile platform is positioned at the destination instruction location. The most typical examples of a communication subsystem are cellular systems (e.g., Global System for Mobile Communications (GSM), Universal Mobile Telecommunications System (UMTS)-time division duplexing (TDD), Long-Term Evolution (LTE), $4^{th}$ Generation (4G), or $5^{th}$ Generation (5G)), and the like. Less typically, the communications subsystem may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). As another alternative, the communication messages may be stored in the system local memory 124 and periodically downloaded using a wireless or hardwire connection. The system 100 is not limited to any particular type of communication subsystem.

In one aspect, the communications subsystem 116 receives media uploads (e.g., streaming data) from the server 134, and the communications subsystem provides the media uploads to the media subsystem 108 for presentation. The second entity may also send instructions selecting a particular message to be displayed, and/or the type of media format to be used. In other aspects, the memory, the location subsystem, communication subsystem, and/or the access point may be enabled in a smartphone, laptop computer, or personal device that can be interfaced with the chassis.

In one aspect, the location subsystem 114 and communications subsystem 116 are embedded with the chassis 102 (as shown), in which case the communications subsystem 116 receives verification information via bus line 118 and receives destination instructions via antenna 120. Alternatively but not shown, the location subsystem and communications subsystem may be embedded with a smartphone or personal device, in which case the subsystems embedded with the chassis are in wireless communications with smartphone/personal device.

In some aspects, a chassis identification code can be extrapolated from an address associated with the communications subsystem 116, the location subsystem 114, or the mobile platform 104. Otherwise, the identification code is a code loaded into local memory 124, or alternatively it can be a mechanical device, such as a DIP switch.

In one aspect, the system 100 further comprises a processor 122 and a non-transitory memory 124. The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the system described herein may include both a volatile memory unit and a non-volatile storage device. The memory may be implemented as shared memory and/or distributed memory in a network device. A mobile platform autonomous driving application 126 is stored in the memory 124 and enabled as a sequence of processor executable steps for autonomously driving the mobile platform to a selected mobile platform geographic location destination.

As would be understood in the art, a vehicle equipped for autonomous driving might include sensors such as cameras, LIDAR, SONAR, photodector ranging systems, and inertial measurement units (IMUs). Obviously, such an equipped vehicle would include mechanisms for steering, braking, and acceleration. Commercial autonomous self-driving systems are provided by Tesla, Waymo, and Nuro.

In another aspect, the communications subsystem 116 may receive verification information indicating the enablement of the media projection subsystem, the enablement of the access point, or the enablement of both the media projection subsystem and the access point. Further, the communications subsystem 116 may receive enablement verification information when the mobile platform is parked in the mobile platform geographic location destination selected by the second entity. Alternatively, the communications subsystem 116 may receive enablement verification information when the mobile platform is following a mobile platform geographic location destination route selected by the second entity. The verification information may be stored in local memory 124 or transmitted to a central server tracking system information.

In one aspect, the system 100 further comprises a targeting subsystem 128 permitting the second entity to select the mobile platform geographic location destination from a plurality of potential destinations. The targeting subsystem 128 may cross-reference each potential destination to a weighted value. The system 100 may also include a reward subsystem 130 providing a reward to the first entity, in response to the selected destination weighted value. Some factors in determining the reward may include the duration of time that the mobile platform occupies the selected destination, the time of day, the destination route, the time of year, and combinations thereof. As shown, the targeting subsystem 128 and reward subsystem 130 are software applications embedded with a non-transitory memory 132 of a central server 134, enabled as a sequence of process executable instructions. Alternatively, as shown in phantom, the targeting and reward subsystems may be stored in local memory 124.

The system 100 may further comprise a camera 136 configured for attachment to the chassis 102, having an output on line 118 to supply images of a geographic location proximate to the chassis 102. The communications subsystem 116 accepts the camera images for local storage or transmission to the central server 134. In one aspect the camera 136 is directed towards the media subsystem viewing screen of used). In this manner any distortion of the image caused as a result of the screen presenting a non-planar or atypical surface can be corrected by the image projector of used), or by a server-based correction software application (not shown).

The camera images may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images my act to verify that the media projector subsystem has been enabled, the platform is stationary, or the platform is located in a particular location. In one aspect, simply recording a change in images, and thus proximate traffic, can be used as a means for proving media projector subsystem enablement. As an alternative, or in addition to the camera, the system may further comprise a proximity detector subsystem to sense nearby motion, to measure the density of proximate vehicular or foot traffic, which data is transmitted by the communications subsystem or recorded in local memory.

As is common in many computer systems, processor 122, which may include a peripheral interface, is connected to the bus line 118, to pull operating instructions from operating system (OS) 140 and software applications in memory 124, and manage communications between the various components of system 100. Likewise, server 134 would be enabled through the use of processor 142 and OS 144. For ease of understanding, the above-described functions have been described as individual components. However, it should be understood that in practice, multiple functions may be performed by a single device, subsystem, or software application.

Figure 2:
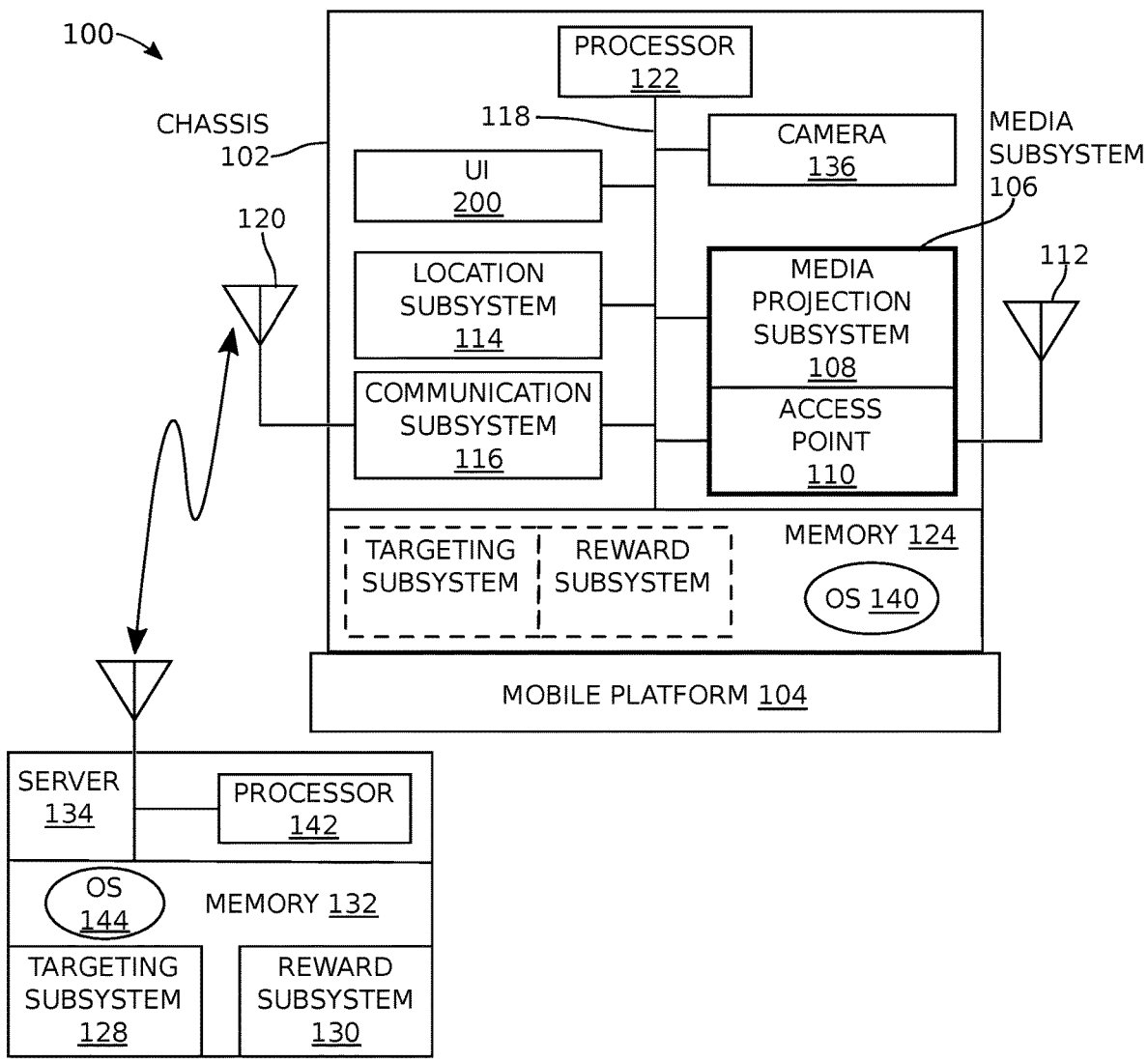
FIG. 2 is a schematic block diagram depicting a variation of the third party-directed mobile media system.

FIG. 2 is a schematic block diagram depicting a variation of the third party-directed mobile media system. In this variation, the system 100 includes a human agent user interface (UI) 200 connected to the communications subsystem 116 on line 118 to receive the mobile platform geographic location destination instructions from the second entity. The UI 200 permits a human agent to receive the destination instructions and to manually drive the mobile platform to that destination. Although not explicitly shown, the system of FIG. 2 may further comprise an autonomous self-driving application as in FIG. 1A.

Figure 3:
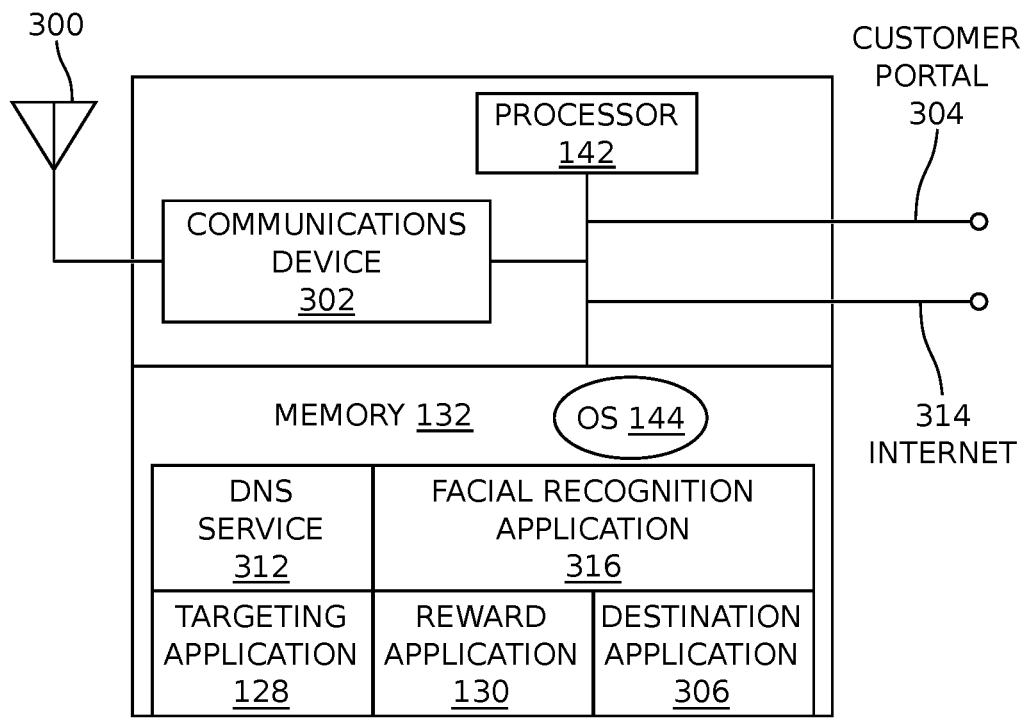
FIG. 3 is a schematic block diagram of the server depicted in FIGS. 1A and 2.

FIG. 3 is a schematic block diagram of the server depicted in FIGS. 1A and 2. For convenience, all the components associated with server 134 are shown embedded as a single schematic block, but it should be understood that these components are not necessarily embedded in a single hardware unit or server, or in communication with each other. Alternatively, the software applications may be cooperating components of an overall software system. As shown, the server 134 connected to antenna 300 through communications device 302, to receive the verification information, and other information from system (100, see FIG. 1A). Although depicted as a wireless communications system, it should be understood that the linkage represented by the communication device may represent Internet and Ethernet linkages to cell tower base stations and cloud search engines, or any other means of communication, and may generally be referred to as portal. The communications device 302 also supplies destination instructions from the second entity.

A second interface on line 304, also referred to as a customer portal, receives client goals such target market, deployment hours, deployment rate, and positions to name a few examples. The customer portal on line 304 also receives explicit destination instructions from a second entity. Alternatively, a destination application 306 is embedded in memory 132, including processor instructions for automatically (without direct human intervention) determining the destination instructions in response to client goals. In one aspect, the destination application is a machine learning (ML) model that is trained by sampling a plurality of manual instructions previously supplied by the second entity, and which infers destinations from the model. Destination instructions may also be responsive to the targeting 128 and reward application 130. The client goals and targeting may be responsive to factors such as location, local demographics, traffic, population density, length of deployment, and combinations thereof. An operating system 144 works in cooperation with the processor 142 to enable software applications in memory 132 and to process information to-and-from communications device 302.

Considering FIGS. 1A, 2, and 3, the access point 110 can be used to support a type of data mapping. The access point is publically accessible to user devices 138 that include smartphones, personal devices, or generally, any type of computing device. Typically, the user devices 138 are enabled for WiFi and Bluetooth communications. As used herein, the term data mapping includes the collection of data from the user devices 138. In one aspect, user data information (e.g., addresses) is collected voluntarily, with the user explicitly agreeing to data collection in response to an access point provided services, such as the provision of an Internet browser, email, Internet, or social media services. For example, if the access point 110 is a WiFi hotspot that accepts Uniform Resource Locator (URL) address requests from a user device (e.g., a smartphone), the URL address requests may be transmitted to a Domain Name System (DNS) service 312 embedded with server 134. The DNS service 312 makes address searches, if necessary, via the Internet interface on line 314. Likewise, the customer portal may be enabled using the Internet interface on line 314. Otherwise, the information is collected without an explicit agreement by the user, where legal. Rewards to the first or second entities may be based upon the volume of traffic through the WiFi hotspot or access point data collected. In some aspects, camera images, in cooperation with a facial recognition software application 316 (e.g., DeepFace), are used for data tracking.

Figure 4C:
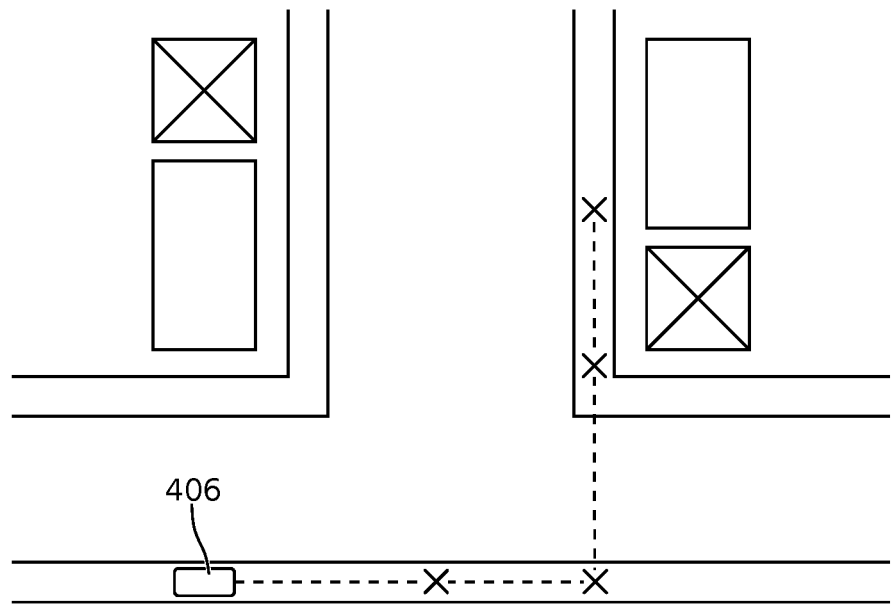
FIGS. 4A through 4C are diagrams depicting a pedestrian mobile media system.
Figure 4A:
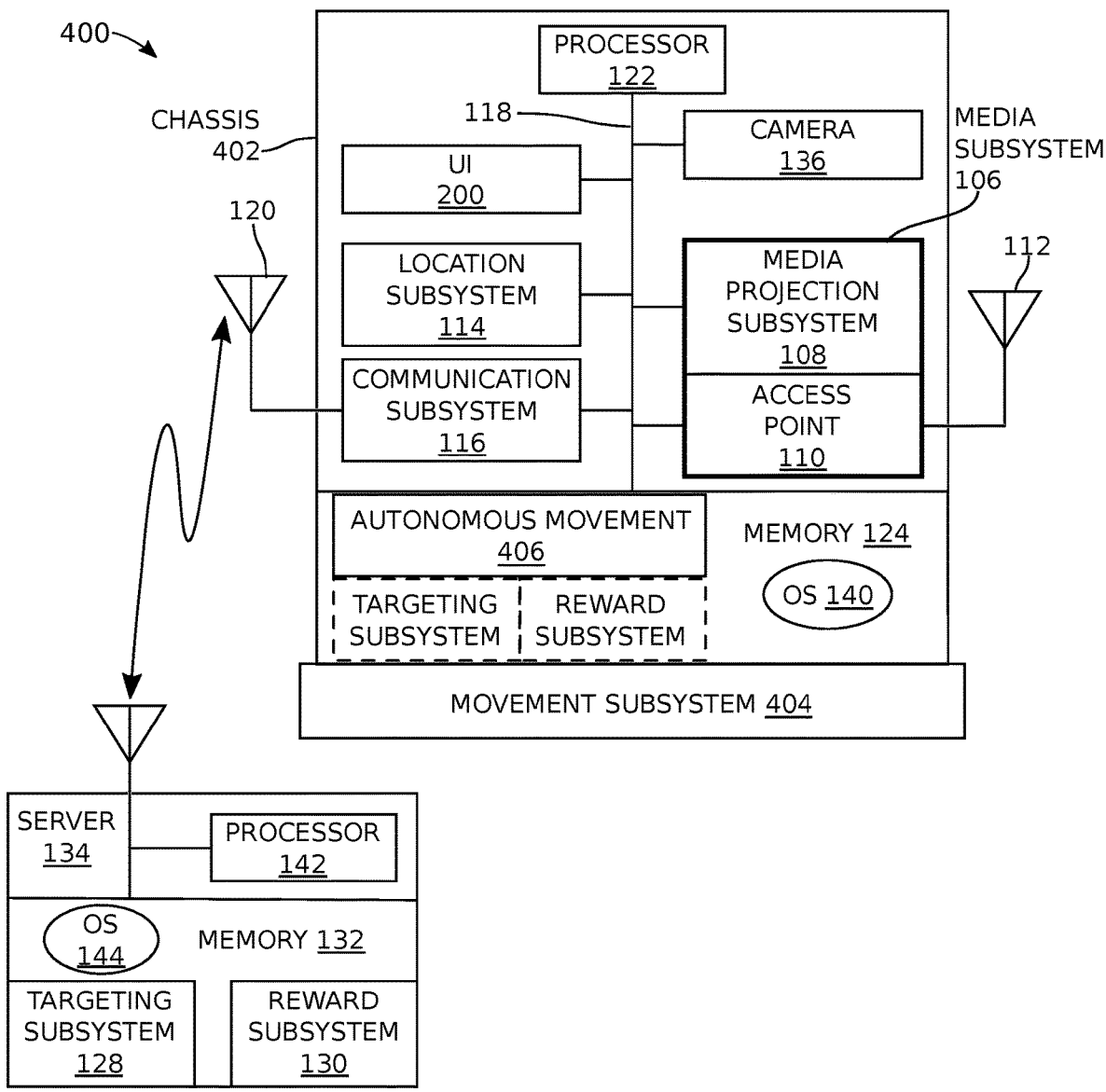
Figure 4B:
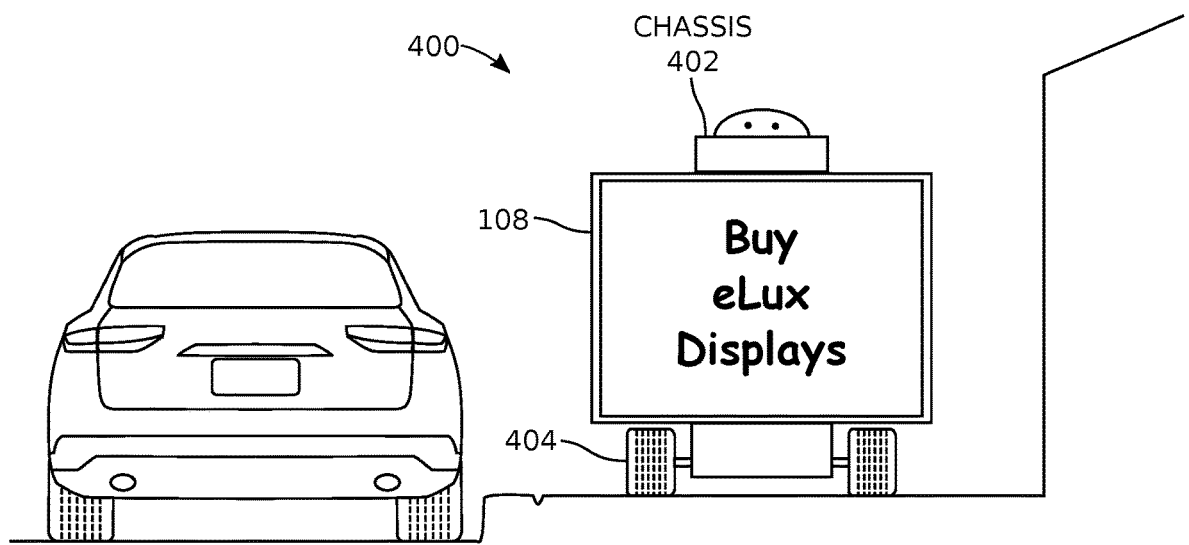

FIGS. 4A through 4C are diagrams depicting a pedestrian mobile media system. The system 400 comprises a chassis 402 and a movement subsystem 404 attached to the chassis, configured for moving the chassis on a pedestrian thoroughfare. For simplicity, the combination of chassis 402 and 404 may be thought of as a robot. For example, the robot may resemble Honda's Advanced Step in Innovative Mobility (ASIMO) humanoid device. However, the chassis 402 and movement subsystem 404 are not limited to any particular chassis shape or means of locomotion. A media subsystem 106 is configured for attachment to the chassis 402. As described above, the media subsystem 106 may be a media projection subsystem 108, a publically accessible access point 110, or both. Some examples of a media projection subsystem 108 include an image projector, a liquid crystal display, a light emitting diode display, a screen deployed over an exterior surface of the chassis, a wallscape, a pedestrian media topper, and combinations thereof.

A location subsystem 114 determines the geographic location of the chassis. A wireless communications subsystem 116 has an interface on line 118 to receive verification information including the chassis geographic location and an interface connected to antenna 120 to receive chassis geographic location destination instructions. In one aspect, the chassis is associated with (e.g., owned by) a first entity and the chassis geographic location destination instructions are received from a different second entity who may, for example, also supply the media. The second entity may also select the explicit media to be displayed and the type of media projection subsystem 108 used to display the media.

A processor 122 and a non-transitory memory 124 are typically embedded with the chassis. In one aspect, an autonomous movement application 406 is stored in the memory 124 and enabled as a sequence of processor executable steps for autonomously directing the movement subsystem 404 to a selected chassis geographic location destination. In common with a self-driving vehicle, such a system may include sensors such as a camera, IMUs, SONAR, LIDAR, or photodection ranging systems, and wheels for enabling the movement subsystem 404. Alternatively or in addition, a human agent UI 200 is connected to the communications subsystem 116 to receive the chassis geographic location destination instructions. The UI 200 permits the movement subsystem 404 to be operated by a human in the manner of a conventional sandwich board sign.

As in system 100, the communications subsystem receives verification information including the enablement of the media projection subsystem, the enablement of the access point, and the enablement of both the media projection subsystem and the access point. The verification information can be stored in local memory 124 or wirelessly transmitted to a central server 134 from which the destination instructions are received. Although not shown in detail, the server of FIG. 4A is substantially the same as the one described in FIG. 3. The communications subsystem 116 may also receive enablement verification information when the chassis is located in a selected stationary geographic location destination or when the chassis is following a selected stationary geographic location destination route.

Also as described in FIGS. 1A, 2, and 3, system 400 may include a targeting subsystem 128, reward subsystem 130, camera 136, and central server 134, the details of which are not repeated here in the interest of brevity.

FIG. 4B depicts a perspective view of an exemplary pedestrian mobile media system occupying a position on a sidewalk. FIG. 4C depicts a route followed by the pedestrian mobile media system in response to destination instructions, with the "Xs" representing (temporarily) stationary positions.

Figure 5:
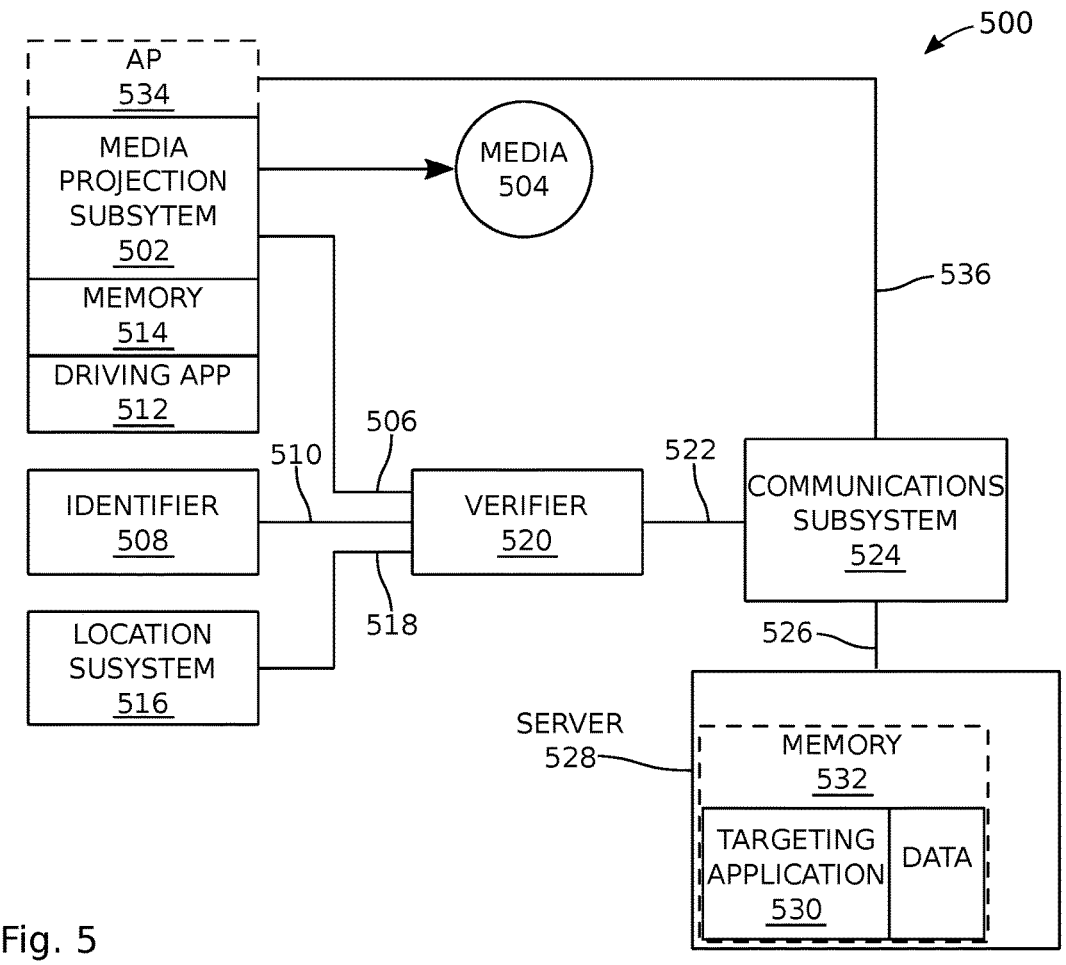
FIG. 5 is a schematic block diagram depicting a media distribution system for an autonomous vehicle.

FIG. 5 is a schematic block diagram depicting a media distribution system for an autonomous vehicle. The system 500 comprises a media projection subsystem 502, associated with a first entity, comprising a roller-retractable flexible display screen 504 capable of being mounted on a roof of an automotive vehicle, and an interface on line 506 to supply an enablement signal in response to the display screen being selectively unrolled for deployment over a substantially vertical external side of the automotive vehicle. An identifier 508 is associated with the media projection subsystem first entity, having an interface on line 510 to supply an identification code. An automotive vehicle autonomous driving application 512, stored in a non-transitory memory 514, includes a sequence of processor executable steps for autonomously driving the automotive vehicle to a selected target vehicle parking location. A location device 516 supplies the geographic location of the media projection subsystem 502 on line 518. A verifier 520 has an interface connected to receive the enablement signal, the identification code, and the geographic location, and an interface on line 522 to supply verification information responsive to the enablement signal, the identification code, and the geographic location. A communications subsystem 524 has an interface on line 522 to receive verification information and an interface (wireless) 526 to transmit the verification information to a server 528 and to receive the selected vehicle parking location from the server.

A targeting software application 530 is stored in a non-transitory memory 532 of the server 528, enabling a sequence of processor executable instructions for permitting the first entity to select a target vehicle parking location from a plurality of value weighted target vehicle parking locations. The media projection subsystem display screen 504 is deployed in the selected target vehicle parking location.

In one aspect as shown in phantom, the system 500 further comprises a publically accessible access point (AP) 534 that is typically WLAN, WPAN, and both WLAN and WPAN devices. The AP 534 is connected to the communications subsystem 524 on line 536 to facilitate communication to a connected user personal device (e.g., smartphone) via the communications subsystem 524 and the server 528.

Figure 6:
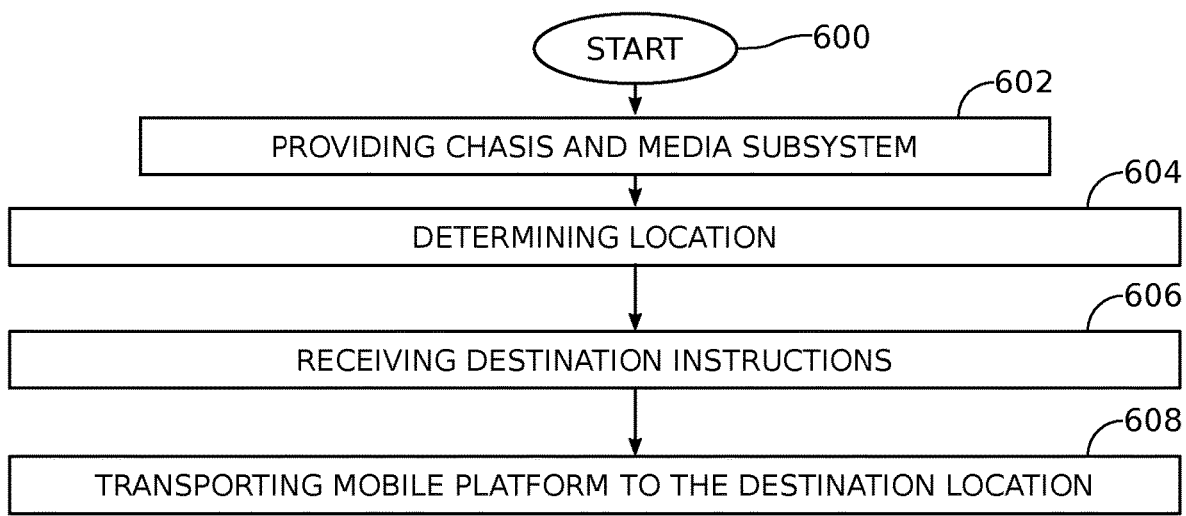
FIG. 6 is a flowchart illustrating a method for third p arty-directed mobile media.

FIG. 6 is a flowchart illustrating a method for third party-directed mobile media. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 600.

Step 602 provides a system with chassis and media subsystems configured for attachment to a mobile platform associated with a first entity. The media subsystem may be a media projection subsystem and/or a publically accessible access point as described above. Step 604 determines a geographic location of the mobile platform. Step 606 receives mobile platform geographic location destination instructions from a second entity, different than the first entity. Note: Step 604 may be performed simultaneously with, or after the performance of Step 606. In Step 608 the mobile platform is transported to the destination location. In one aspect, Step 602 provides a mobile platform autonomous driving application and in Step 608 the mobile platform is transported using the autonomous driving application. Alternatively, Step 602 provides a UI, Step 606 relays the destination instructions to the UI, and in Step 608 the mobile platform is transported through actions performed by a human agent.

Figure 7:
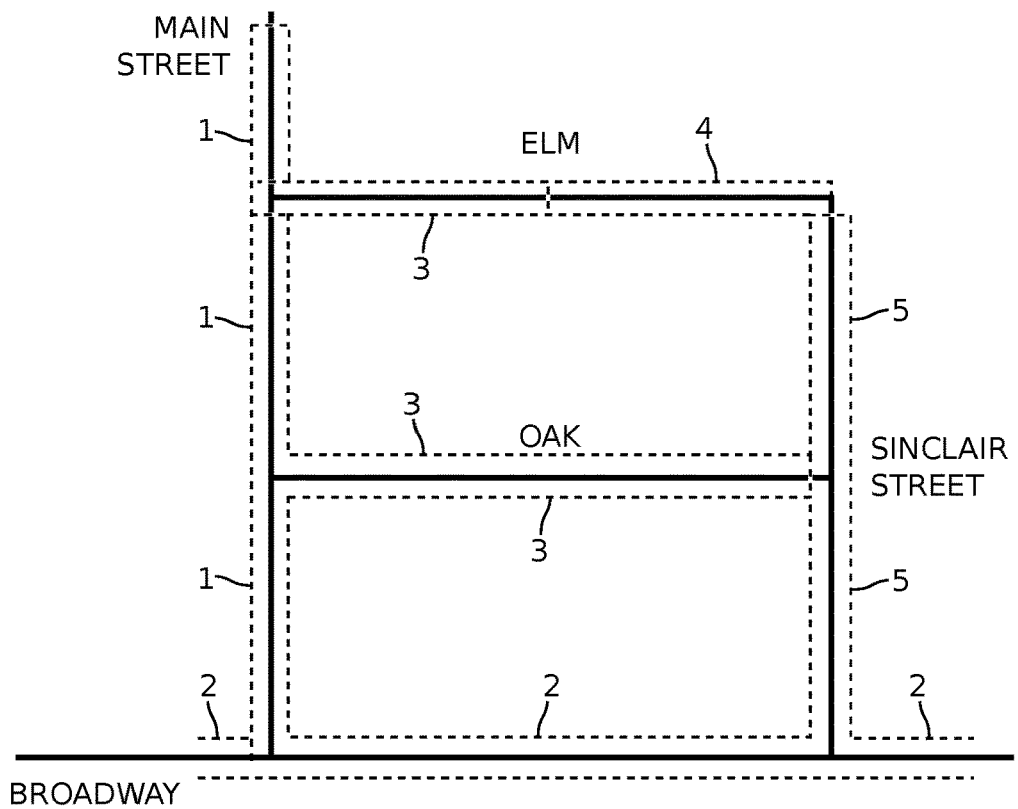
FIG. 7 is a plan view of geographic regions cross-referenced to the weighted value of various stationary positions.

FIG. 7 is a plan view of geographic regions cross-referenced to the weighted value of various stationary positions. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

The systems described above can be adapted for use in a model where an advertiser or commercial entity pays for service based upon performance. For example, an advertising (server) client may contract with a system provider stipulating a target market and deployment hours/rate. The system provider (intermediary organization) determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted location system, where the mobile display or access point may be selectively deployed. In cooperation with the deployment of the display and/or access point, an organization or associated user is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the display and/or access point have actually been deployed, and once deployed, the location of the system.

Figure 8:
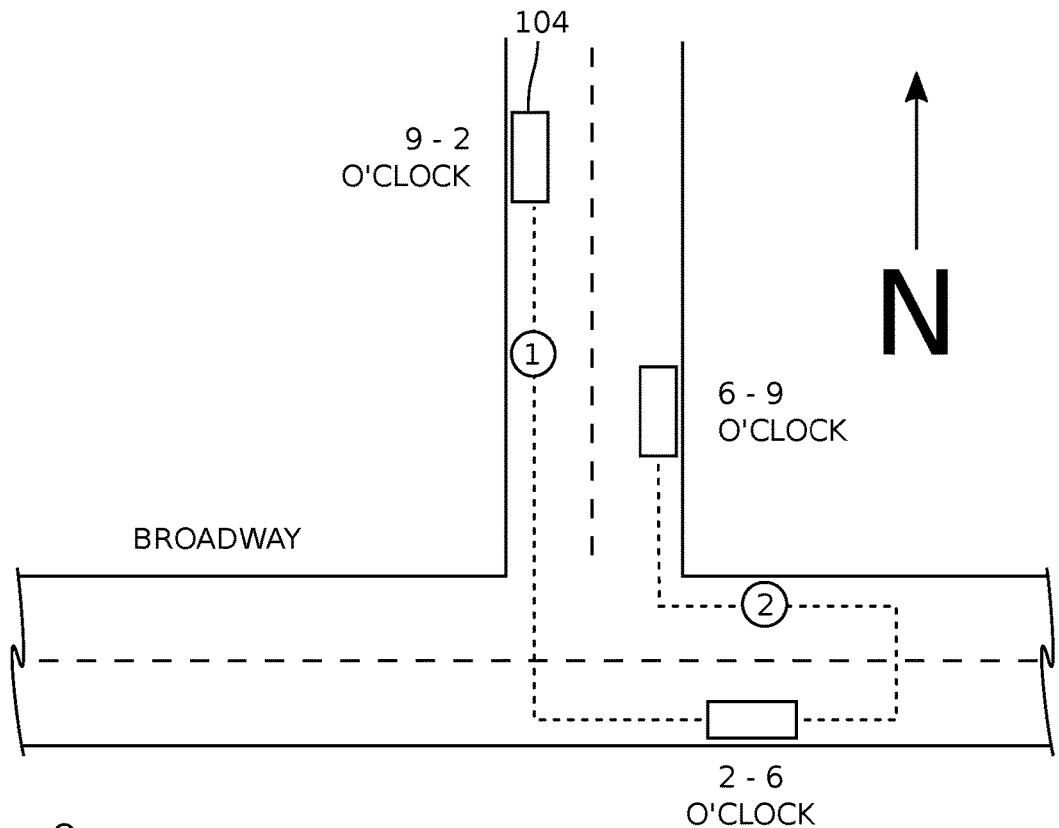
FIG. 8 is a diagram depicting an exemplary series of mobile platform destinations with reference to FIGS. 1A and 2.

FIG. 8 is a diagram depicting an exemplary series of mobile platform destinations with reference to FIGS. 1A and 2. Initially, mobile platform 104 is parked on Main Street. The platform 104 is shown parked along the West side of Main Street in the hours from 10 until 2 o'clock. The second entity sends instructions for the mobile platform 104 to be moved at 2 o'clock to the South side of Broadway, where it is parked from 2 until 6 o'clock. The second entity then sends instructions for the mobile platform 104 to be moved at 6 o'clock to the East side of Main Street, where it is parked until 9 o'clock.

Figure 9A:
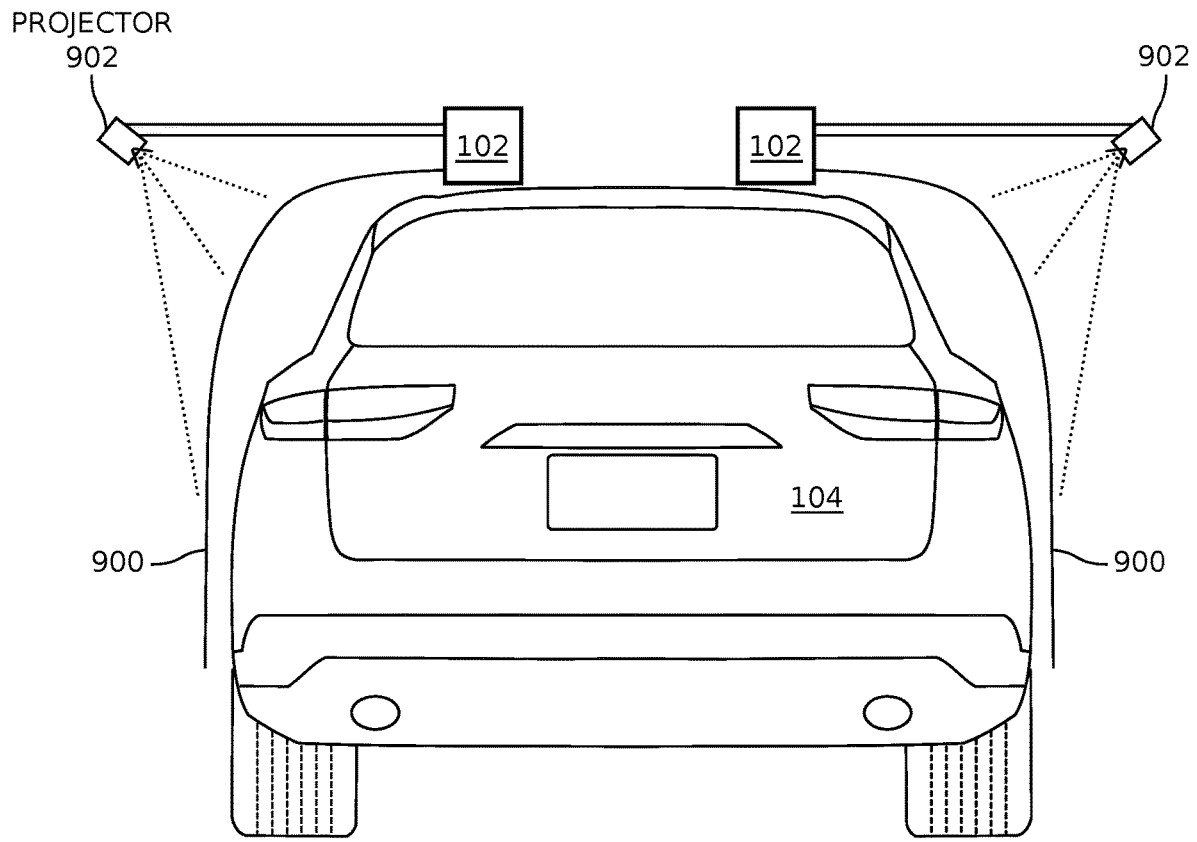
FIGS. 9A and 9B are diagrams depicting the media subsystem enabled as an image projector.
Figure 9B:
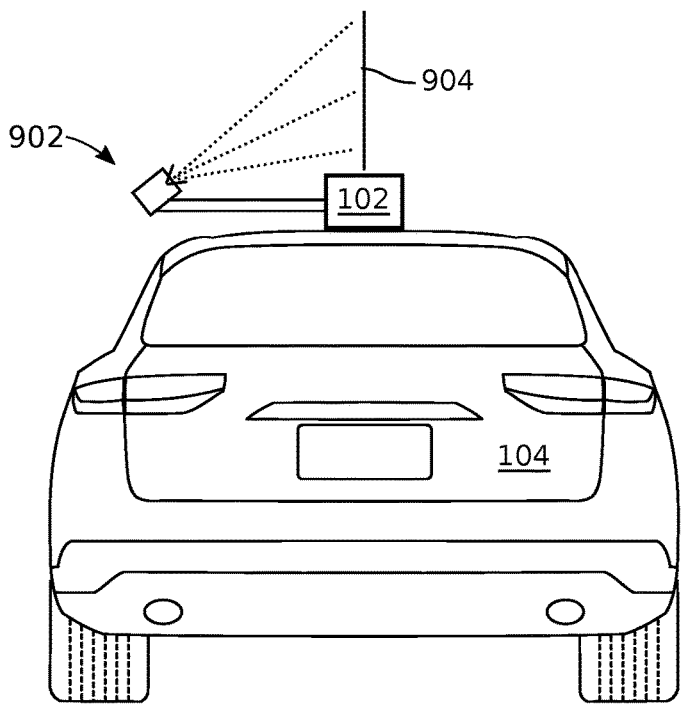

FIGS. 9A and 9B are diagrams depicting the media subsystem enabled as an image projector. Here, the chassis 102 is configured for attachment to the roof of an automotive vehicle 104. In FIG. 9A a viewing screen 900 is deployed over an exterior surface (e.g., door) of the automotive vehicle 104. However, it should be understood that the viewing screen may, alternatively, be deployed over other exterior surfaces (e.g., front or back). Here, two chasses are shown with associated projectors 902, and with screens 900 overlying driver and passenger side doors. However, the system is not limited to any particular number of chasses, with supporting subsystems. In FIG. 9B a popup 904 extends vertically up from a substantially planar horizontal roof. Alternatively but not shown, the imaging projector subsystem may project images on both sides of the popup viewing screen, or more than one chassis/viewing screen/imaging projector subsystem may be attached to the roof. Otherwise, the popup screen may be a simple printed screen or an LED screen.

Figure 10:
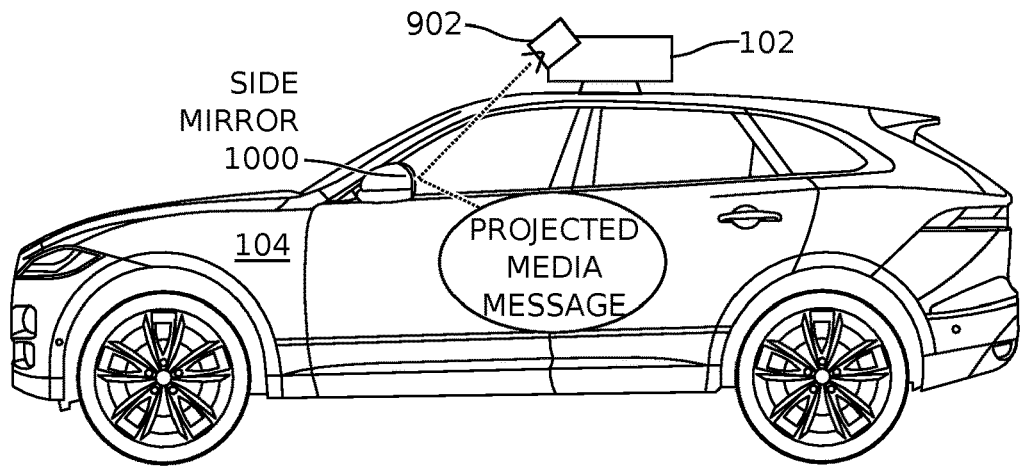
FIG. 10 depicts a variation of the media subsystem enabled as an image projector.

FIG. 10 depicts a variation of the media subsystem enabled as an image projector. In this aspect the chassis 102 (as described above) is configured for attachment to a roof of an automobile 104, having a side mirror 1000. An imaging projector 902 is selectively engageable to project an image (projected media message) on the side mirror 1000, with the image being reflected by the side mirror. The image can be reflected, for example, on a vertical exterior surface of the automobile (e.g., door) as shown, a sidewalk located adjacent to the automobile, or a wall located adjacent to the automobile. In some aspects, if the imaging surface is a dark color or a rough surface, a portable screen may be temporarily attached to the surface. For example, in the case of a car door imaging surface, a magnetic screen can be temporarily applied to the door, or the screen can be hung from the top of the door or clamped by the window.

Figure 11:
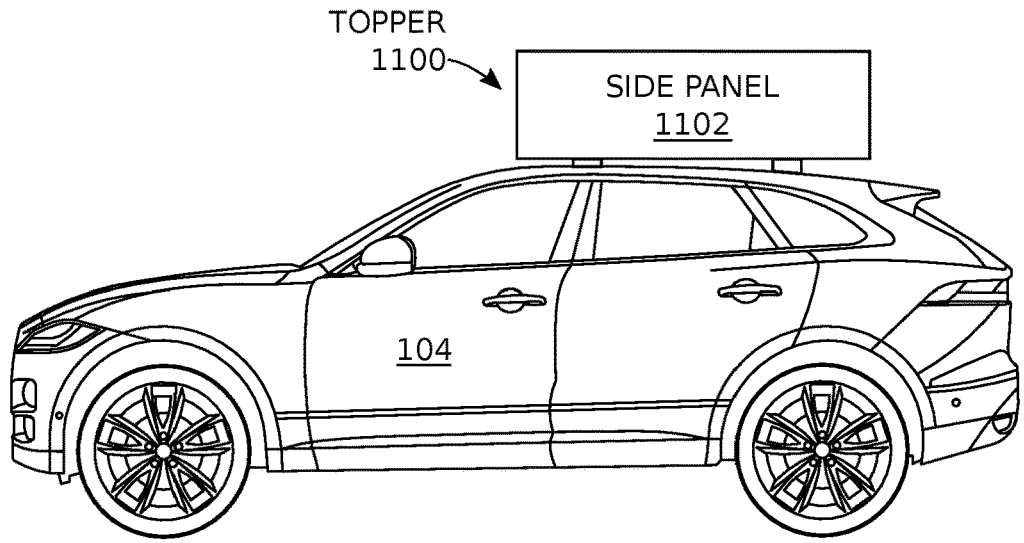
FIG. 11 depicts the media subsystem enabled as a topper.

FIG. 11 depicts the media subsystem enabled as a topper. The media projection topper 1100 is configured for attachment to a roof of the vehicle 104, having display side panels 1102 to project media. A topper is typically a narrow width rectangular box, with the narrow width facing (orthogonal to) a vehicle's front and rear ends. The rectangular box length is formed by vertically oriented side panels parallel to the vehicle doors. Media messages are formed on the side panels. Typically the side panels are backlit so the media messages can be seen at night. Toppers are often used for advertising, as mounted on taxis or commercial automobiles. The topper 1100 may also be an electronic display such as an LCD or LED display.

Figure 12:
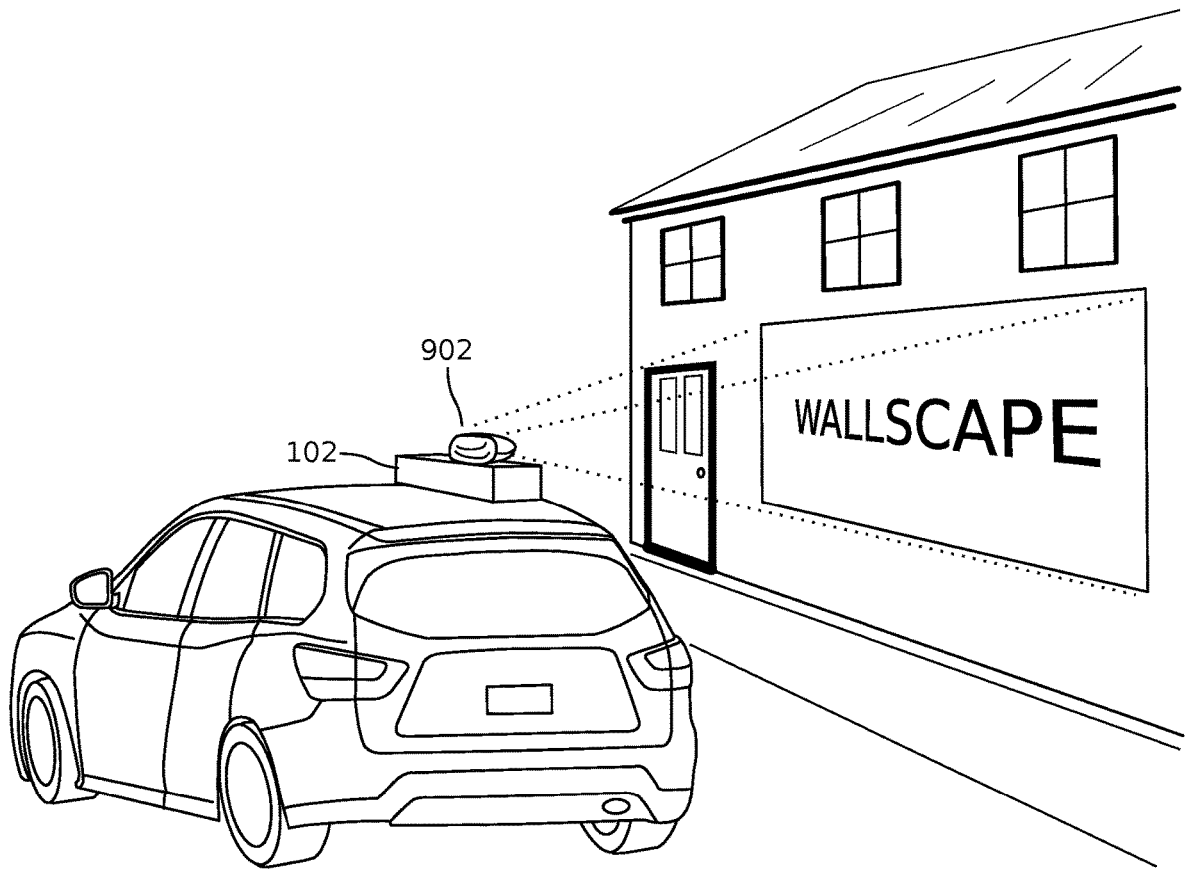
FIG. 12 is a diagram depicting the media subsystem enabled as a wallscape.

FIG. 12 is a diagram depicting the media subsystem enabled as a wallscape. As shown, the chassis 102 and imaging projector 902 are configured for attachment to the roof of an automobile. The imagine projector 902 is selectively engageable to project an image on an adjacent vertical wall surface when the mobile platform 104 is parked in a stationary geographic location.

Figure 13:
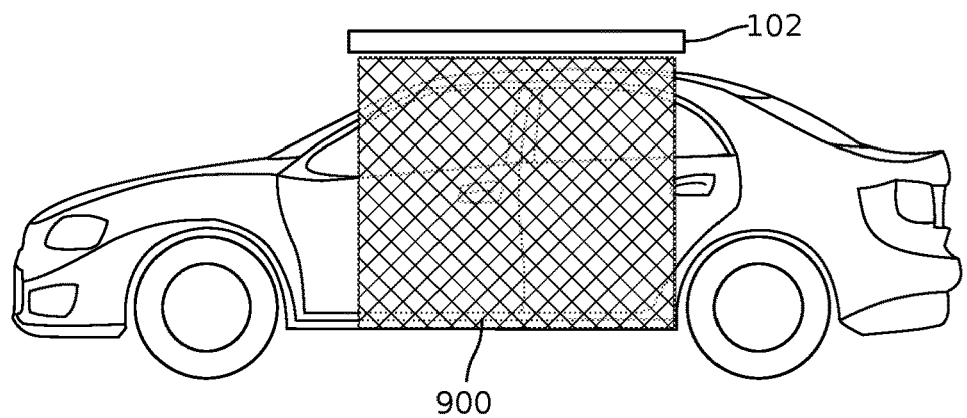
FIG. 13 is a diagram depicting the media subsystem enabled as a retractable screen.

FIG. 13 is a diagram depicting the media subsystem enabled as a retractable screen. The chassis 102 is mounted to an automobile roof and the screen 900 is retractable. The screen 900 may be printed with a fixed advertising message, warning, or alert. In one aspect, the screen includes a field of light emitting diodes (LEDs) or liquid crystal display (LCD) for projecting (i.e., creating) a visual image.

Returning to FIG. 6, the flowchart can also be understood to describe a method for pedestrian mobile media. Step 602 provides a chassis, a movement subsystem, and a media subsystem attached to the chassis. Step 604 determines a geographic location of the chassis. Step 606 wirelessly receives chassis geographic location destination instructions. Note: Step 604 may be performed simultaneously with, or after the performance of Step 606. In Step 608 the chassis moves on a pedestrian thoroughfare to the destination location. In one aspect Step 602 provides a chassis associated with a first entity and Step 606 receives chassis geographic location destination instructions are received from a second entity, different than the first entity. In another aspect, Step 602 provides an autonomous movement application and in Step 608 the autonomous movement application directs the movement subsystem to a selected chassis geographic location destination. Alternatively, Step 602 provides a UI, Step 606 relays the destination instructions to the UI, and in Step 608 the chassis is moved in response to actions performed by a human agent.

Figure 15:
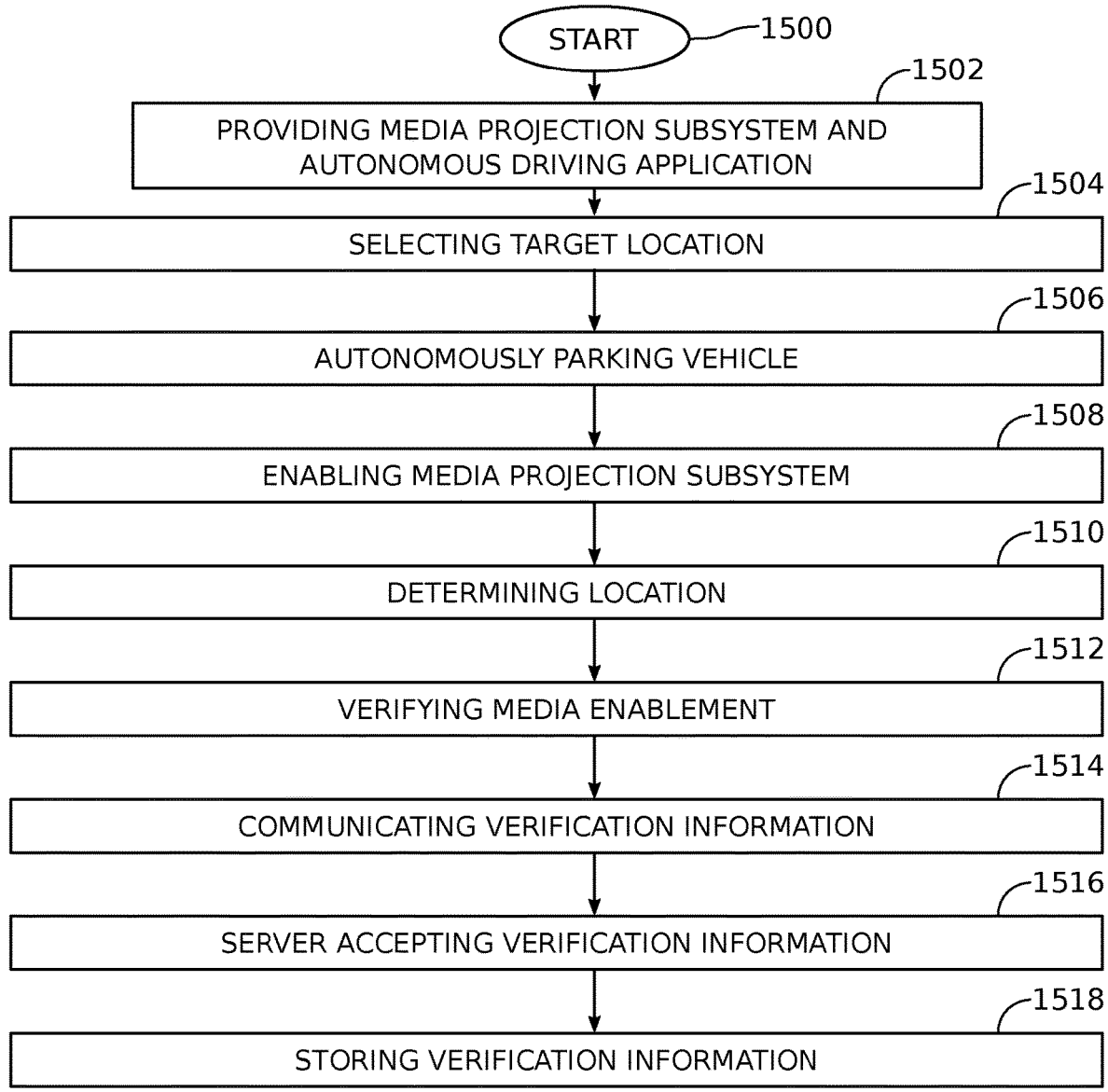
FIG. 15 is a flowchart illustrating a method for monitoring the provision of media distributed by an autonomous automotive vehicle.

FIG. 15 is a flowchart illustrating a method for monitoring the provision of media distributed by an autonomous automotive vehicle. The method begins at Step 1500. Step 1502 provides a media projection subsystem capable of being attached to an automotive vehicle, an autonomous driving application, and an identifier associated the media projection subsystem. In Step 1504 a first entity selects a target location using a targeting software application, stored in a server memory, and enabled as a sequence of instructions. In Step 1506 the autonomous driving applications parks the automotive vehicle at the selected target location, selected from a plurality of value weighted target parking locations. Subsequent to parking the automotive vehicle, Step 1508 selectively enables the media projection subsystem. Step 1510 determines the geographic location of the media projection subsystem. Step 1512 verifies the identifier and the enablement of the media projection system. Step 1514 communicates, to a server, verification information including the media projection subsystem location, identifier, and enablement of the media projection subsystem. In Step 1516 the server accepts the verification information, and in Step 1518 the server stores the verification information in a non-transitory memory. In one aspect, Step 1502 provides a publically accessible access point (AP), and Step 1508 selectively enables the AP.

Figure 16:
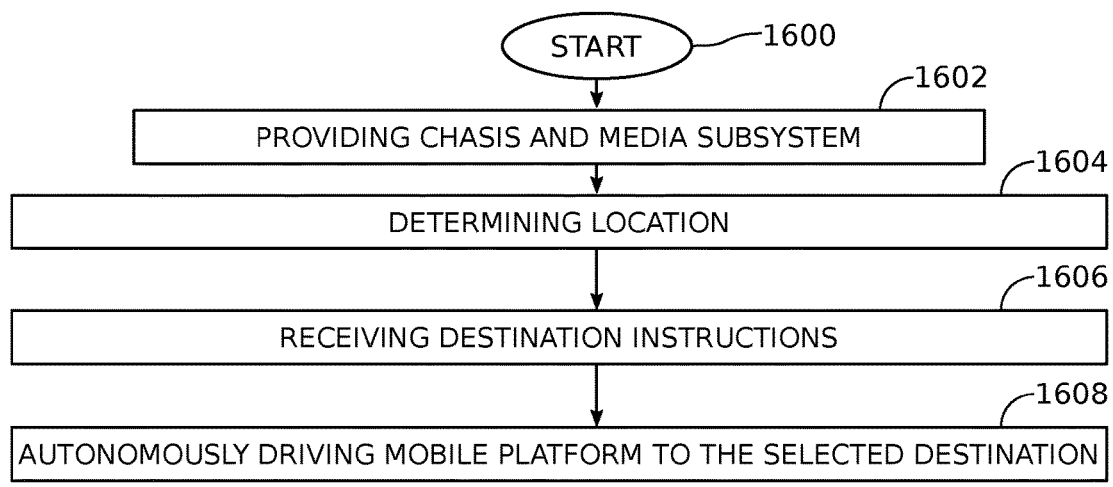
FIG. 16 is a flowchart illustrating a method for autonomously driving a mobile media system.

FIG. 16 is a flowchart illustrating method for autonomously driving a mobile media system. The method starts at Step 1600. Step 1602 provides a chassis, configured for attachment to a mobile platform, an autonomous driving application, and a media subsystem. Step 1604 determines a geographic location of the mobile platform. Step 1606 wirelessly receives mobile platform geographic location destination instructions. Note: Step 1604 may be performed simultaneously with, or after the performance of Step 1606. Step 1608 autonomously drives the mobile platform to the selected mobile platform geographic location destination. In one aspect, Step 1602 provides a chassis associated with a first entity, and Step 1606 receives the destination instructions supplied by a second entity, different than the first entity.

Figure 17A:
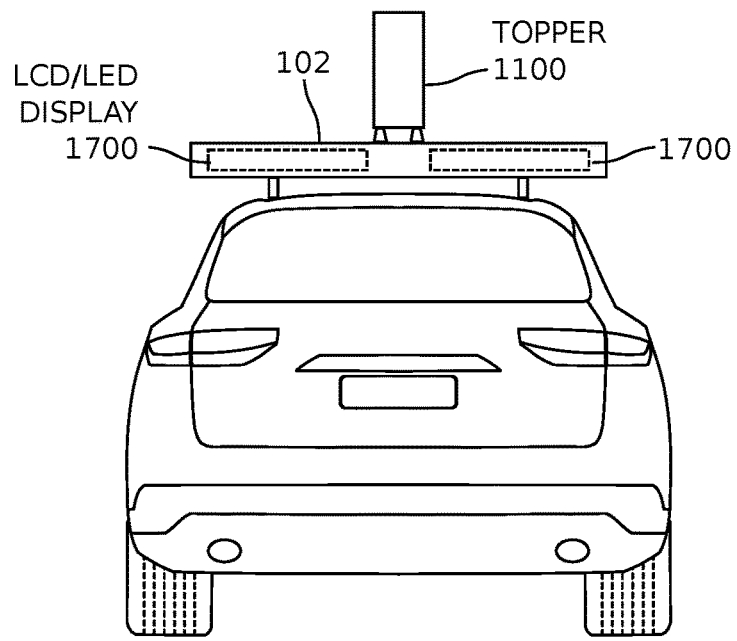
FIGS. 17A through 17C depict the media subsystem enabled as an LCD or LED display.
Figure 17B:
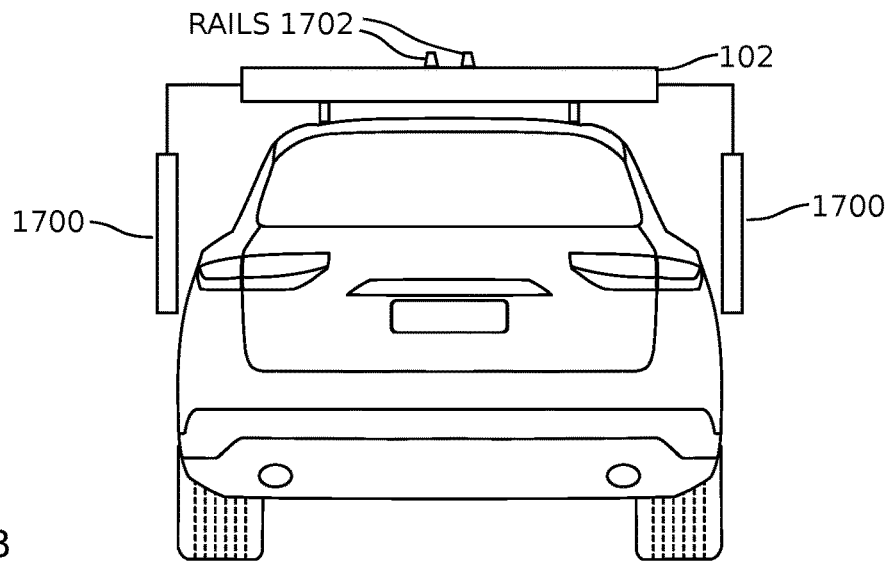
Figure 17C:
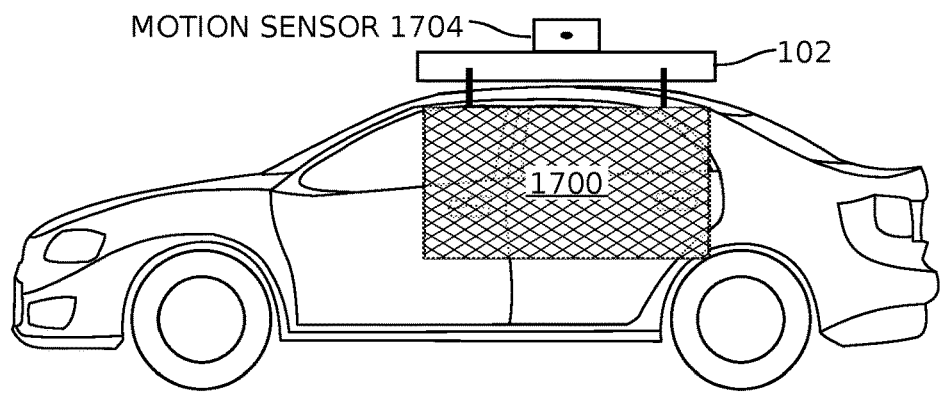

FIGS. 17A through 17C depict the media subsystem enabled as an LCD or LED display. In FIG. 17A rigid panel displays 1700 (shown in phantom) are secured inside chassis 102 for storage while the vehicle is being moved. In FIGS. 17B and 17C the displays 1700 are deployed over an exterior surface of the vehicle. FIG. 17A also depicts a topper 1100 secured to the top of the chassis, as shown for example by roof rack type rails 1702. FIG. 17C depicts a motion sensor 1704 mounted on the chassis 102 or on the display (not shown). The motion sensor permits the displays to be powered down, to save energy, if no pedestrian or vehicular traffic is detected.

Figure 14:
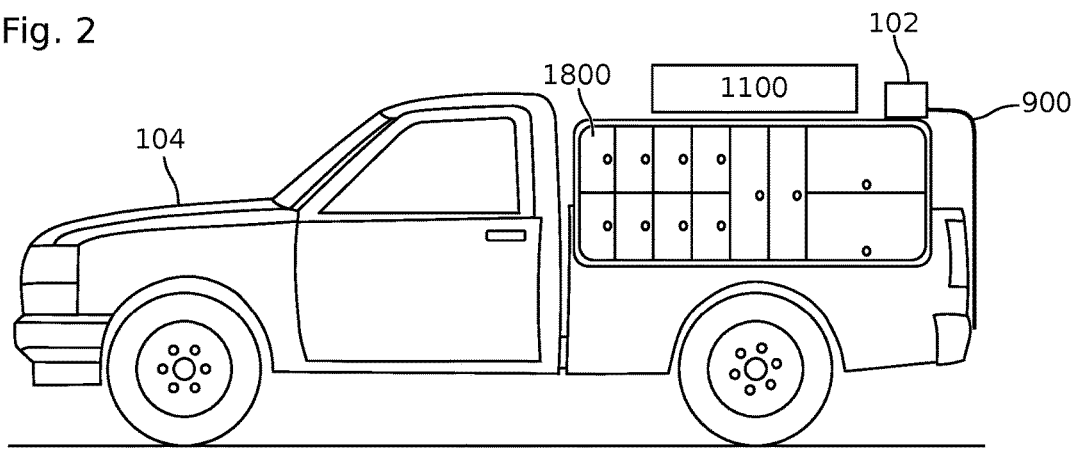
FIG. 14 is a diagram depicting a mobile platform including a mobile locker system in combination with a media subsystem.

FIG. 14 is a diagram depicting a mobile platform including a mobile locker system in combination with a media subsystem. The mobile locker system 1800 is described in detail in parent application Ser. No. 17/097,256, filed on Nov. 13, 2020, entitled SYSTEM AND METHOD FOR MOBILE GIG LOCKER, and which is incorporated herein by reference. Besides the mobile lockers 1800, the mobile platform 104 also includes a mobile media chassis 102 with a deployed viewing screen 900, and a topper 1100. Although a pickup truck mobile platform 104 is shown as an example, it should be noted that the combination of the mobile lockers 1800 and media subsystem are not limited to any particular type of mobile platform. Likewise, although a topper 1100 and screen 900 are shown as examples, the combination of mobile lockers and media subsystem are not limited to any particular media projection subsystem. Although not explicitly shown in this figure, the combination of mobile locker and media subsystem may further include a publically accessible access point, as described above.

Systems and methods have been provided for the provision of mobile media communications. Examples of particular message structures, schematic block linkages, and hardware units have been presented to illustrate the invention. However, the invention is not limited to merely these examples. Other variations and embodiments of the invention will occur to those skilled in the art.

We claim:

1. A third party directed mobile media system comprising:
   a chassis, configured for attachment to a mobile platform associated with a first entity;
   a media subsystem, configured for attachment to the chassis, selected from the group consisting of a media projection subsystem and a publically accessible access point selected from the group consisting of a wireless local area network (WLAN), wireless personal area network (WPAN), and both WLAN and WPAN devices;
   a location subsystem to determine a geographic location of the mobile platform;
   a wireless communications subsystem having an interface to receive verification information including the mobile platform geographic location and to receive mobile platform geographic location destination instructions from a second entity;
   a targeting subsystem cross-referencing each potential destination to a weighted value; and,
   a reward subsystem providing a reward to the first entity, in response to a selected destination weighted value and factors selected from the group consisting of the duration of time that the mobile platform occupies the selected destination, the time of day, the time of year, and combinations thereof.

2. The system of claim 1 further comprising:
   a processor;
   a non-transitory memory;
   a mobile platform autonomous driving application stored in the memory and enabled as a sequence of processor executable steps for autonomously driving the mobile platform to a selected mobile platform geographic location destination.

3. The system of claim 1 wherein the communications subsystem receives verification information selected from the group consisting the enablement of the media projection subsystem, the enablement of the access point, and the enablement of both the media projection subsystem and the access point.

4. The system of claim 3 wherein the communications subsystem receives enablement verification information when the mobile platform is parked in the mobile platform geographic location destination selected by the second entity.

5. The system of claim 3 wherein the communications subsystem receives enablement verification information when the mobile platform is following a mobile platform geographic location destination route selected by the second entity.

6. The system of claim 1 wherein the media projection subsystem is selected from a group consisting of an image projector, a retractable screen deployed over an exterior surface of the mobile platform, a liquid crystal display, holographic display, a light emitting diode display, a media topper, popup, wallscape, switchable glass displays, and combinations thereof.

7. The system of claim 1 wherein the targeting subsystem permits the second entity to select the mobile platform geographic location destination from a plurality of potential destinations.

8. The system of claim 1 further comprising:
a camera, configured for attachment to the chassis, having an output to supply images of a geographic location proximate to the chassis; and,
wherein the communications subsystem accepts the camera images.

9. The system of claim 1 further comprising:
a human agent user interface (UI) connected to the communications subsystem to receive the mobile platform geographic location destination instructions from the second entity.

10. A pedestrian mobile media system comprising:
a chassis;
a movement subsystem attached to the chassis, configured for moving the chassis on a pedestrian thoroughfare;
a media subsystem, configured for attachment to the chassis, selected from the group consisting of a media projection subsystem and a publically accessible access point selected from the group consisting of a wireless local area network (WLAN), wireless personal area network (WPAN), and both WLAN and WPAN devices;
a location subsystem to determine a geographic location of the chassis;
a wireless communications subsystem having an interface to receive verification information including the chassis geographic location and to receive chassis geographic location destination instructions;
a targeting subsystem cross-referencing each potential destination to a weighted value;
a reward subsystem providing a reward in response to a selected destination weighted value and factors selected from the group consisting of the duration of time that the mobile platform occupies the selected destination, the time of day, the time of year, and combinations thereof.

11. The system of claim 10 wherein the chassis is associated with a first entity and the chassis geographic location destination instructions are received from a second entity.

12. The system of claim 10 wherein the chassis includes:
a processor;
a non-transitory memory;
an autonomous movement application stored in the memory and enabled as a sequence of processor executable steps for autonomously directing the movement subsystem to a selected chassis geographic location destination.

13. The system of claim 10 wherein the communications subsystem receives verification information selected from the group consisting the enablement of the media projection subsystem, the enablement of the access point, and the enablement of both the media projection subsystem and the access point.

14. The system of claim 10 wherein the communications subsystem receives enablement verification information when the chassis is located in a selected stationary geographic location destination.

15. The system of claim 10 wherein the communications subsystem receives enablement verification information when the chassis is following a selected stationary geographic location destination route.

16. The system of claim 10 wherein the media projection subsystem is selected from a group consisting of an image projector, a screen deployed over an exterior surface of the chassis, a liquid crystal display, a light emitting diode display, a wallscape, a holographic display, a pedestrian media topper, and combinations thereof.

17. The system of claim 10 wherein the targeting subsystem permits the selection of the chassis geographic location destination from a plurality of potential destinations.

18. The system of claim 10 further comprising:
a camera, configured for attachment to the chassis, having an output to supply images of a geographic location proximate to the chassis; and,
wherein the communications subsystem accepts the camera images.

19. The system of claim 10 further comprising:
a human agent user interface (UI) connected to the communications subsystem to receive the chassis geographic location destination instructions.

* * * * *